Figure 1:
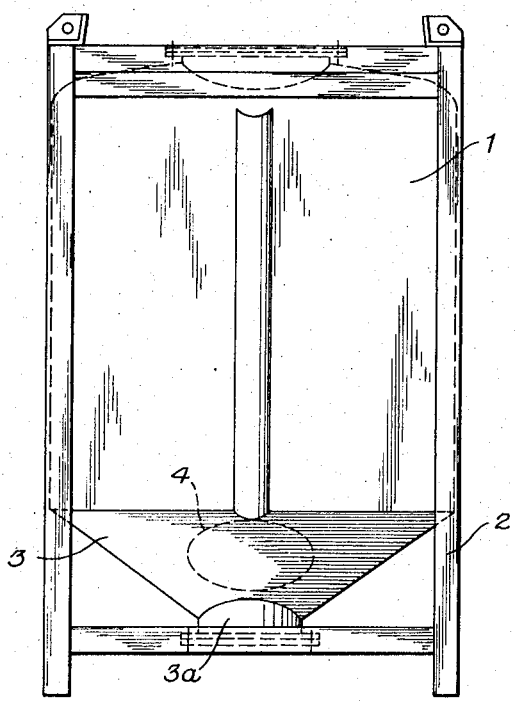

United States Patent
Schlüter

[15] 3,700,145
[45] Oct. 24, 1972

[54] CONTAINER FOR LOOSE MATERIAL
[72] Inventor: Franz Schlüter, Bruhl, Germany
[73] Assignee: Deutsche Gold- und Silber-Scheideanstalt vormals Roessler, Frankfurt (Main), Germany
[22] Filed: May 28, 1968
[21] Appl. No.: 732,673

[30] Foreign Application Priority Data
June 20, 1967   Germany..........P 15 06 866.3

[52] U.S. Cl.................................................222/202
[51] Int. Cl..................................................B65g 1/08
[58] Field of Search......222/198, 202, 203, 372, 462, 222/213, 526–529, 214, 219, 181, 185, 196

[56] References Cited
UNITED STATES PATENTS 2,560,480   7/1951   Rogers et al...........222/203 X
3,363,806   1/1968   Blakeslee et al........222/202 X
3,320,879   5/1967   Edwards et al. ........222/196 X
2,381,802   8/1945   Booth et al. ...............222/200

FOREIGN PATENTS OR APPLICATIONS
458,590   12/1936   Great Britain.............222/202

Primary Examiner—Samuel F. Coleman
Assistant Examiner—Norman L. Stack, Jr.
Attorney—Stephens, Huettig & O'Connell

[57]   ABSTRACT

A container composed of a synthetic material such as polyethylene, epoxy or polyester resins and used for transporting powdery or granular materials, has a knocker base plate fastened to its wall. This plate protects the container when the plate is struck to loosen the powdery or granular materials.

3 Claims, 3 Drawing Figures

PATENTED OCT 24 1972

3,700,145

INVENTOR

Franz Schlüter

BY Stephens, Huettig and O'Connell
ATTORNEYS

CONTAINER FOR LOOSE MATERIAL

Containers such as specified in the German VDI Trade Regulations are often used for transporting large amounts of powdery or granular materials, or for liquids or viscous materials. In order to permit the material in the container to flow out easily, the lower portion of the container is formed as a cone which terminates in a discharge sleeve which can be closed by a cover or any other locking means.

When the transported materials do not fall out freely, some auxiliary apparatus is usually needed in order to remove the material from the container. Basically several means are available, for example, tilting mechanisms, vibrating platforms, transversely rotating the container means, and using the mouth opening as a discharge sleeve and also the use of knocking means.

The use of knocking or vibrating devices in most cases is a matter of choice since it is the least expensive and, for all practical purposes, does not require additional space, this being often an extremely important fact with certain types of containers.

Since many materials are very corrosive, they should be transported in containers composed of synthetic material which are supported in a reinforcing metal frame which, at the same time, permits the container to be lifted by a crane and easily stored. Containers composed of synthetic material to which vibrating or knocking devices are attached are seldom used. This is because the synthetic materials forming the body of the container are, for example, polyethylene, epoxy resins or polyester resins, which were not believed to be sufficiently mechanically stable and resistant to the relatively strong vibration or knocking forces. Attempts have been made to overcome this disadvantage by attaching the knocking or vibrating device to the metal frame. However, this requires more profile freedom on the side of the container to which the vibrator is attached. For transportation purposes, this is not a good solution. A relatively strong vibration force must be used to loosen the material in the container even though it be incompletely done.

This invention avoids the above disadvantages in a simple manner by fastening a knocker base plate on the wall of the container body made of synthetic material. This makes the body sufficiently resistant to usable knocking forces and the uniform distribution of vibrating forces onto the container wall is accomplished. Damage to the wall of the container by knocking forces is prevented. It is preferred that the knocker base plate has a curved periphery as being, for example, circular or oval so no tension points occur.

Figure 2:
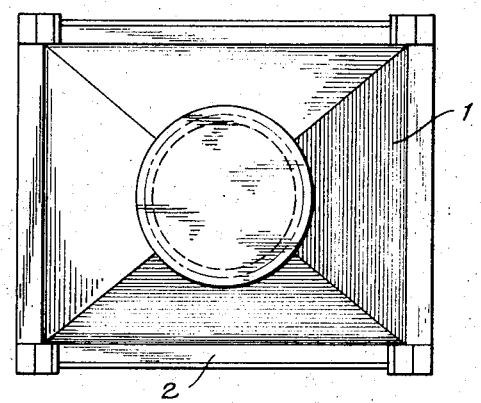
Figure 3:
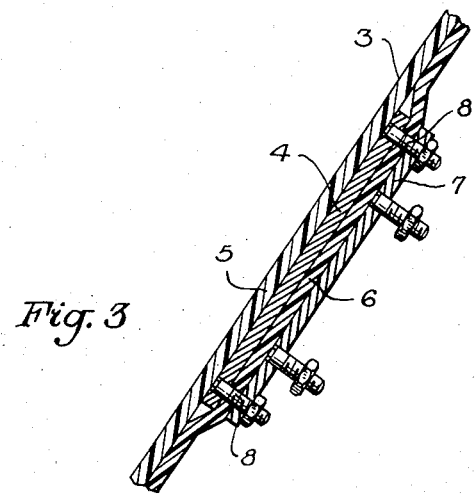

The means by which the objects of the invention are obtained are described more fully with reference to the accompanying schematic drawings in which:

FIG. 1 is a front elevational view of the container;
FIG. 2 is a plan view of FIG. 1; and
FIG. 3 is an enlarged cross-section of a detail showing the knocker plate fastened to the container.

As shown in FIGS. 1 and 2, the container body 1 composed of a synthetic material, such as polyethylene, epoxy or polyester resins, is supported in a metal frame 2. The lower portion 3 of the container body is cone shaped and terminates in a discharge sleeve 3a which can be closed. As shown in FIG. 3, a metal knocker base plate 4 is installed on one wall surface of the conical lower portion 3. Base plate 4 is fastened to the outer surface 5 of the container body composed of synthetic material. A second outer layer 6 of synthetic material covers base plate 4 and extends over the entire wall surface of the container body. An outer second metal plate 7 covers the layer 6 and forms a shield. It is rigidly fastened to base plate 4 by means of threaded bolts 8 which penetrate layer 6. If required, an unbalanced knocking mechanism which can be a pendulum, a circular knocker or an electromagnetic knocker can be attached to outer plate 7.

The knocker base plate can also be mounted on the interior wall of the container body when, above all, non-corrosive loose material is being transported.

This invention has the advantage that simple means are used to produce relatively heavy and strong knocking forces in a container composed of synthetic material without the fear that the container walls would be damaged.

The knocker base plates, if needed, can be attached to several parts of the container in order to assure a satisfactory discharge of the goods in the container even though they may, for example, be very viscous.

Having now described the means by which the objects of the invention are obtained,

I claim:

1. A container for transporting powdery or granular loose material comprising a container body composed of a synthetic plastic material, and a metal knocker base plate fastened to and supported by the outer surface of said body, an outer layer of synthetic plastic material covering said plate, an outer second metal plate covering said outer layer of synthetic plastic material, and fastening means for rigidly connecting said second metal plate to said metal knocker base plate.

2. A container as in claim 1, said base plate having a curved periphery.

3. A container as in claim 1, said synthetic plastic material being selected from the group consisting of polyethylene, epoxy resin, and polyester resin.

* * * * *